United States Patent
Pelissier et al.

(10) Patent No.: US 6,911,008 B2
(45) Date of Patent: Jun. 28, 2005

(54) COMPOUND ULTRASOUND IMAGING METHOD

(75) Inventors: Laurent Pelissier, North Vancouver (CA); Eric Fattah, Coquitlam (CA); Kris Dickie, Chilliwack (CA)

(73) Assignee: Ultrasonix Medical Corporation, Burnaby BC (CA)

( * ) Notice: Subject to any disclaimer, the term of this patent is extended or adjusted under 35 U.S.C. 154(b) by 89 days.

(21) Appl. No.: 10/368,822

(22) Filed: Feb. 19, 2003

(65) Prior Publication Data

US 2004/0193047 A1 Sep. 30, 2004

(51) Int. Cl.[7] ................................................ A61B 8/00
(52) U.S. Cl. ............................................................ 600/443
(58) Field of Search .................................. 600/440–441, 600/443, 447; 128/916; 73/625–626

(56) References Cited

U.S. PATENT DOCUMENTS

| | | | |
|---|---|---|---|
| 4,159,462 A | 6/1979 | Rocha et al. | |
| 4,319,489 A | 3/1982 | Yamaguchi et al. | |
| 4,649,927 A | 3/1987 | Fehr et al. | |
| 5,678,552 A | * 10/1997 | Savord | 600/447 |
| 5,957,852 A | * 9/1999 | Hossack et al. | 600/447 |
| 5,976,088 A | * 11/1999 | Urbano et al. | 600/443 |
| 6,050,942 A | * 4/2000 | Rust et al. | 600/437 |
| 6,126,598 A | 10/2000 | Entrekin et al. | |
| 6,126,599 A | 10/2000 | Jago et al. | |
| 6,135,956 A | 10/2000 | Schmiesing et al. | |
| 6,159,152 A | 12/2000 | Sumanaweera et al. | |
| 6,193,663 B1 | * 2/2001 | Napolitano et al. | 600/447 |
| 6,210,328 B1 | 4/2001 | Robinson et al. | |
| 6,224,552 B1 | 5/2001 | Jago et al. | |
| 6,283,917 B1 | 9/2001 | Jago et al. | |
| 6,325,759 B1 | 12/2001 | Pelissier | |
| 6,390,981 B1 | * 5/2002 | Jago | 600/443 |
| 6,511,426 B1 | * 1/2003 | Hossack et al. | 600/437 |
| 6,544,177 B1 | * 4/2003 | Robinson | 600/443 |
| 6,554,770 B1 | * 4/2003 | Sumanaweera et al. | 600/443 |

* cited by examiner

Primary Examiner—Francis J. Jaworski
(74) Attorney, Agent, or Firm—Akin Gump Strauss Hauer & Feld, L.L.P.

(57) ABSTRACT

A compound ultrasound imaging method includes the steps of acquiring component frames with different scanline properties, such as different angles, scanline durations, control voltages, etc., and compounding them in real-time.

6 Claims, 8 Drawing Sheets

500  502  504 frame #1:

frame #2

*frame #3*

*frame #1*

*frame #2*

*frame #3*

COMPOUND ULTRASOUND IMAGING METHOD

BACKGROUND OF THE INVENTION

The present invention relates to compound ultrasound diagnostic imaging. In particular, the present invention relates to an ultrasound diagnostic imaging method of acquiring and merging a succession of ultrasound images with different properties to yield an ultrasound image in real time.

BACKGROUND—DESCRIPTION OF PRIOR ART

Ultrasound imaging systems are used in medicine to explore internal areas of a patient's body. Ultrasonic imaging is non-destructive and versatile and can provide high quality diagnostic images.

A typical medical ultrasound imaging system has a transducer, a custom built electronic controller, and a user interface. The transducer typically has several piezoelectric transducer elements regularly placed on a frame. The transducer may have elements arranged in any of several different geometries, depending upon the medical application for which the transducer will be used. The controller drives the transducer and collects and processes data from the transducer to provide, store, display and manipulate images. The user interface may include various input/output devices which allow a user to control the operation of the imaging system. The input/output devices typically comprise at least a control panel, a video display, and a printer. See, for example, U.S. Pat. No. 6,325,759 which is incorporated herein by reference.

The electronic controller can send and receive electric signals to and from any of the transducer elements. To create a diagnostic image, the controller transmits electrical excitation signals to the transducer elements. The transducer elements convert the excitation signals into ultrasonic vibrations which are transmitted into the patient's body. The ultrasonic vibrations typically have frequencies in the range of about 2 MHZ to about 12 MHZ. The ultrasonic vibrations are scattered and reflected by various structures in the patient's body. Some of the reflected and/or scattered ultrasonic vibrations, which may be called echoes, are received at the transducer. The echoes cause the transducer elements to generate electrical signals. After the excitation signals have been transmitted the controller receives and processes the electric signals from the transducer elements.

The resulting image is displayed in real time on a display. The classic presentation of the display, called B-mode, is a two-dimensional image of a selected cross-section of the patient's body. It is desirable to obtain high resolution images and so state of the art medical ultrasound imaging systems provide dynamic digital focusing and adaptive filtering systems which process the signals received from numerous transducer elements.

Spatial compounding is an imaging technique in which a number of ultrasound images of a given target with different properties are combined into a single compounded image. Examples of spatial compounding may be found in U.S. Pat. Nos. 4,649,927; 4,319,489; and 4,159,462. Real time spatial compound imaging is performed by rapidly acquiring a series of totally or partially overlapping component image frames with different properties, utilizing an array transducer to implement electronic beam steering and/or electronic translation of the component frames. If N is the number of component frames, the compound image is typically generated by averaging the N component frames. However, each frame of N component frames includes a set of lines at the same angle. For example, if three frames are compounded, frame #1 is built with lines shot/received at −15°, frame #2 is built with lines shot/received at 0°, and frame #3 is built with lines shot/received at +15°.

The compounded image typically shows less speckle and less image artifacts as the N components frames have different properties, chosen to generate different speckle and artifacts. By averaging, the coherent, real structures are added and the non-coherent speckle and artifacts are averaged.

U.S Pat. No. 4,649,927 to Fehr et al., U.S. Pat. No. 4,319,489 to Yamaguchi et al., U.S. Pat. No. 4,159,462 to Rocha et al., U.S Pat. No. 6,126,598 to Entrekin et al., U.S Pat. Nos. 6,126,599 and 6,283,917 and 6,224,552 to Jago et al., U.S Pat. No. 6,135,956 to Schmiesing et al., U.S Pat. No. 6,159,152 to Sumanaweera et al. and U.S Pat. No 6,210,328 to Robinson et al. all relate to compounding N component frames generated by looking at different directions. U.S. Pat. No. 6,210,328 to Robinson et al. suggests to vary N as a function of a user parameter. U.S. Pat. No. 6,126,598 to Entrekin et al. and U.S Pat. No. 6,159,152 to Sumanaweera et al. suggest to vary N as a function of a user parameter or the probe motion.

The prior art relates to compounding frames exhibiting different angle properties albeit the same property for each line in a frame. In some cases such as small footprint phased-array probes, phased linear arrays as well as some linear arrays and convex arrays this method cannot be applied because the side lobes are too visible and generate too many artifacts. Furthermore, when frames with different angles are generated, non-overlapping areas are typically not shown because they typically belong to angled images which exhibit more side lobe artifacts when not averaged. This leads to loss of useful data for image compounding.

Since the compound imaging method is based on compounding N component frames, there is an inherent drawback; that is a persistence effect will be noticed, especially when N gets larger. This persistence effect can be decreased by, for example, reducing N, reducing the depth of observation, reducing the line density or increasing frame rate. Thus, it is desirable that the most useful information be acquired and used in the resulting image in the amount of time necessary to generate N frames.

There is a need for an image compounding method adapted to run on any type of probe or imaging geometry and which uses the full amount of information generated during the acquisition time.

BRIEF SUMMARY OF THE INVENTION

The present invention relates to a method of compound ultrasound imaging and an ultrasound imaging system operated for generating compounded ultrasound images. N ultrasound frames are generated, exhibiting different geometric properties; that is component lines of the frame have different properties such as different angles for example, which are chosen to generate different types of speckle and artifacts. A moving average frame processor continuously averages the last N frames and displays the result on the screen. The frames' differing properties include frame geometry, or frame frequency, for example. This allows compounding of frames on a wider range of ultrasound probes and ultrasound imaging modes (e.g., regular B-mode, trapezoidal imaging, etc.).

In a first embodiment of the present invention, frames with different line properties and trapezoidal shapes are acquired and averaged preferably in real time to generate a compound ultrasound image.

In a second embodiment of the present invention, frames with different shapes and different transmit/receive parameters are acquired and averaged preferably in real time to generate a compound ultrasound image.

In a third embodiment of the present invention, frames with different shapes, including lines of different durations are acquired and averaged preferably in real time to generate a compound ultrasound image.

The present invention allows generating compound images for basically all types transducers, including linear, convex and phased arrays. This allows the use of compound imaging for a very wide range of applications. For example, compound imaging applied to trapezoidal imaging using an 8 MHz linear array can be used as an imaging mode for high-resolution exploration of abdominal structures up to say 10 centimeters.

The present invention uses the full amount of information contained in the component frames to yield the compound image. There is no loss of information on the sides of the image. Furthermore, areas which are less compounded, i.e., less important areas for which the number of overlapping frames is less, can be chosen to be as artifact free as possible to enhance the overall image quality.

The present invention permits adjustment of the amount of frame compounding for the various areas in the resulting image. For example, the geometrical settings may provide more line density and angle independence between frames in the center of the image and less on the sides. This allows improving the image compounding results in the center of the image while keeping a good resolution image on the sides.

On the sides of the transducer the number of elements in the aperture can decrease up to half of the aperture. This reduces the focusing quality and increases side lobes and artifacts especially when focusing with angles. The present invention provides a way to, while performing compounding with very independent frames in the center of the image for example, keep good focusing properties on the sides by reducing angulations of frames on the sides.

In another embodiment, the present invention acquires frames at a faster frame rate overall, but by cutting the unused parts, reduces the persistence effect happening after compounding the component frames.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF PREFERRED EMBODIMENTS OF THE INVENTION

Figure 1:
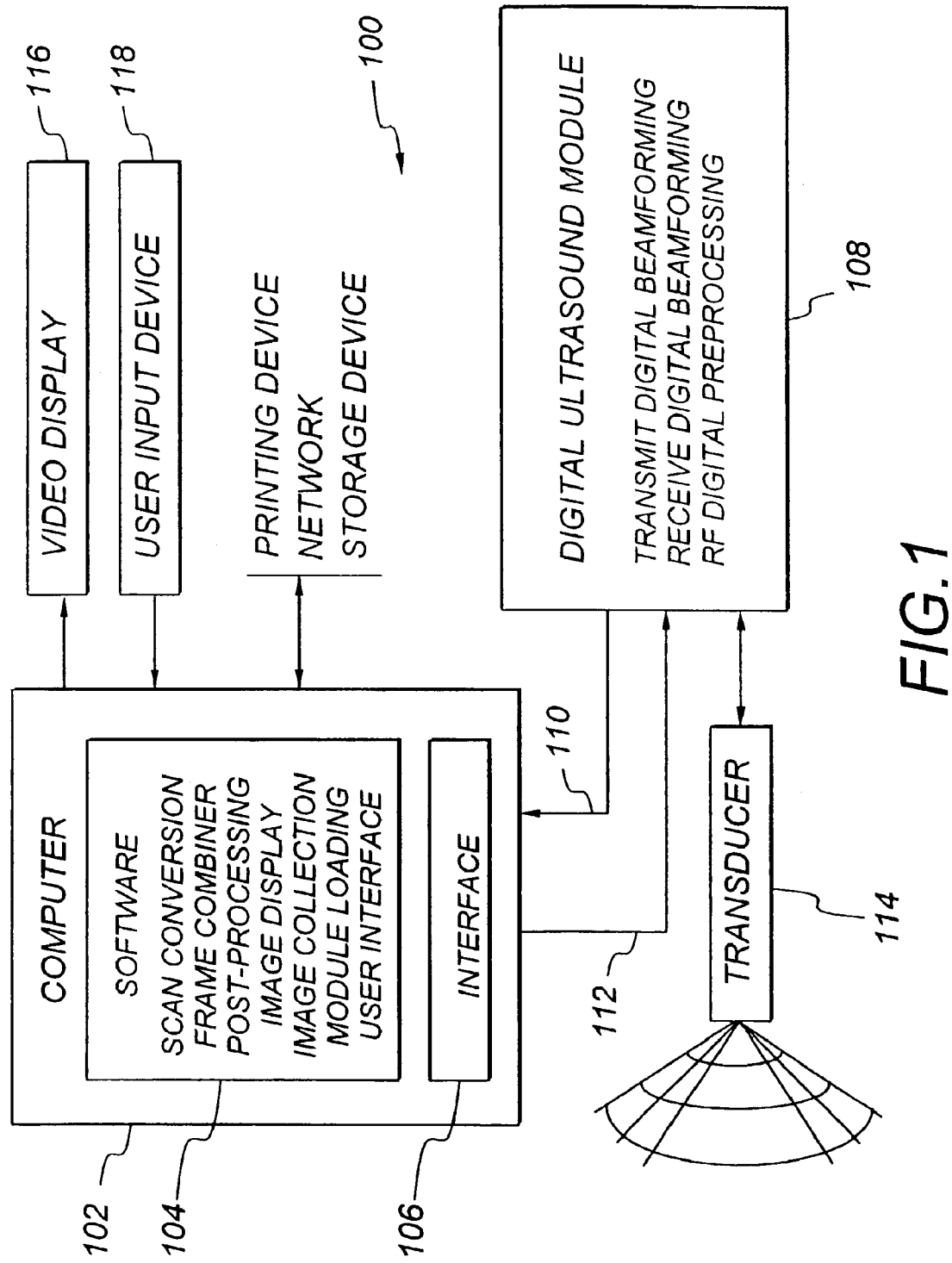
FIG. 1 shows an ultrasound system for producing compounded ultrasound images.

FIG. 1 shows an ultrasound imaging system 100 for producing ultrasound images. The ultrasound system 100 includes a digital ultrasound module 108 and a computer 102. The ultrasound module 108 is coupled to a transducer 114. The transducer 114 generates and receives acoustic signals. The acoustic signals that are generated by the transducer 114 are directed towards a body region of a patient, and then reflected back to the transducer 114 as echo signals. The echo signals obtained by the transducer 114 are sent back to the ultrasound module 108. The ultrasound module 108 processes the echo signals to extract data vectors called preprocessed digital data 110. The preprocessed digital data 110 is sent to the computer 102. The computer 102 then stores the preprocessed digital data 110 and performs a display processing in real-time to produce an ultrasound diagnostic image. The ultrasound diagnostic image is displayed on a video display 116 connected to the computer 102. See U.S. Pat. No. 6,325,759, for example.

The computer 102 is controlled by computer software 104. The computer software 104 includes device driving software for input/output devices such as control panel devices, ECG (Electro-cardiogram) devices, printing devices, and storage devices. The computer software 104 is also responsible for graphic user interface, patient information editing and user configuration settings. The computer software 104 has networking capabilities to exchange information on a network of ultrasound devices, as it will be described below. The ultrasound module 108 contains programmable hardware and software blocks. As is detailed below, the computer software 104 can completely program the ultrasound module 108 through an interface 106, by sending control signals 112. A user input device 118 allows the user to interact with the computer software 104, and modify the digital ultrasound module 108 configuration.

The ultrasound module 108 transmits electric pulses to the transducer 114 in accordance with its configuration. The ultrasound module 108 simultaneously processes echo signals coming back from the transducer 114 by converting each received echo signal to a digital value, beam-forming the digital values, summing and filtering the beam-formed digital values. The ultrasound module 108 finally processes beam-formed and filtered digital values to extract the preprocessed data 110. The preprocessed data 110 can represent echo amplitude information, velocity information or any other useful information for diagnosis, depending on the ultrasound module 108 configuration.

Preprocessed data 110 is sent directly to the computer memory via the interface 106. The interface 106 transfers the preprocessed data 110 to the computer memory. The computer software 104 performs a real-time scan conversion for producing the ultrasound diagnostic image. The computer software 104 also performs post-processing functions such as frame averaging or edge detection. The real-time display processing is fully customizable by the user through the user input device 118. The computer software 104 collects images in memory for cineloop visualization.

To perform compound imaging the computer software 104 holds a frame combiner module which will compound N frames and show the result in real-time on the display.

Figure 2:
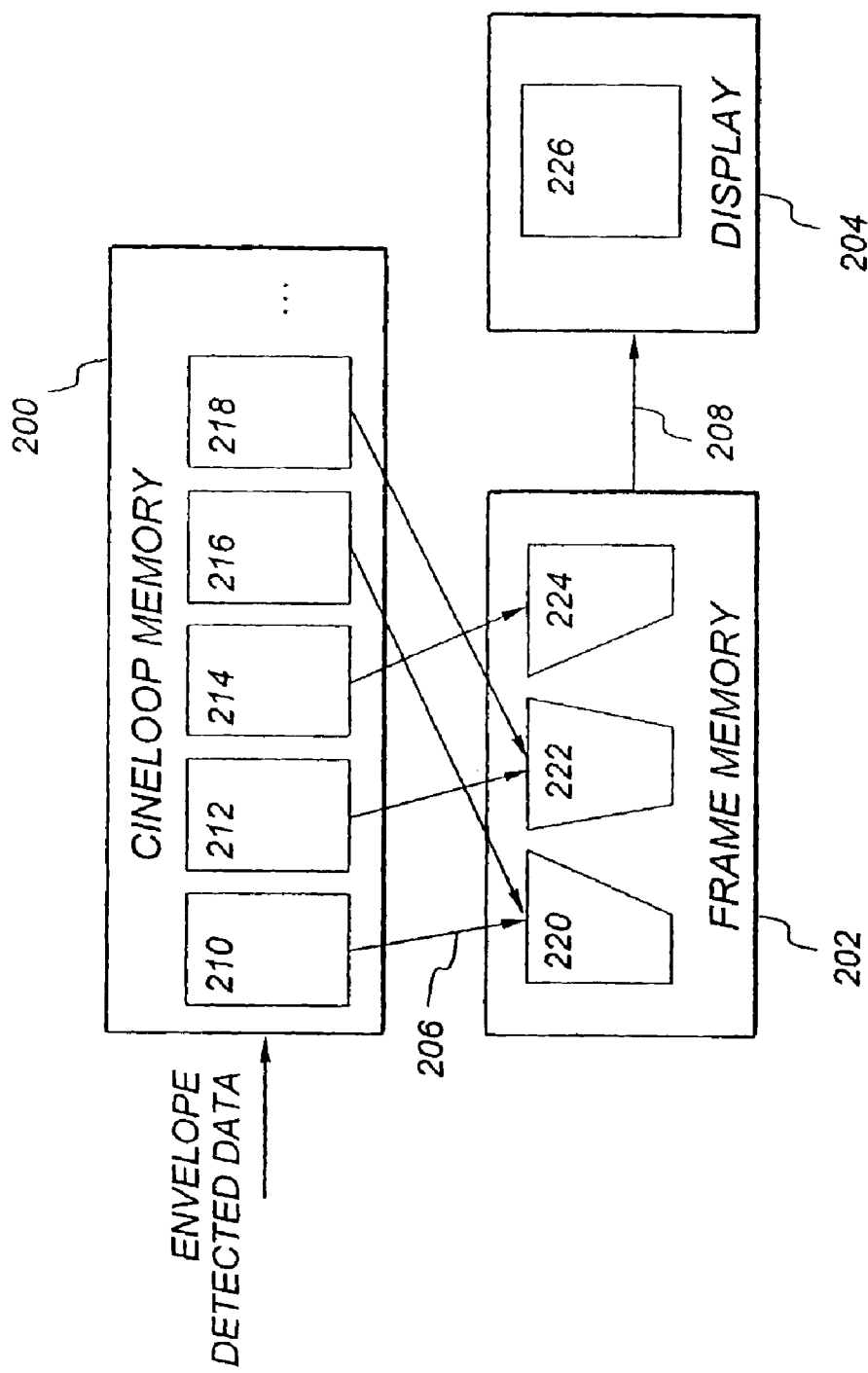
FIG. 2 illustrates the scan conversion and frame combining process.

FIG. 2 shows an example of a frame combiner for real-time display of compounded ultrasound images. For that example, the number N of frames to be compounded will be three. For B-mode images, preprocessed data 110 is the envelope-detected data. Successive frames 210, 212, 214, 216 and 218 sent from the digital ultrasound module 108 are stored in the cineloop memory 200, typically located in the computer 102. A frame memory 202 holds the N component images 220, 222 and 224, which are to be compounded. Component images 220, 222 and 224 are typically scan-converted images obtained after scan conversion 206.

Each time a new image is received in the cineloop memory, it is scan-converted and stored to its corresponding geometry-image location in frame memory 202. Then, through compound processing 208 the final display image 226 is generated and displayed on the display 204. Compound processing 208 may be a simple average of component images 220, 222 and 224 with variable averaging coefficients depending on the number of overlapping component images.

For example, say frame 210 is the first frame received, it is scan converted and stored in its corresponding geometry component image 220. Then frame 212 is the second frame received, scan converted and stored in component image 222. Then frame 214 is the third frame received, scan converted and stored in component image 224. At that point, three frames 210, 212 and 214 have been received and can be compounded via compound processing 208 to be displayed on display 204. Then frame 216 is the fourth frame received, scan converted and stored in its corresponding geometry component image 220. Right after scan conversion of 216, a new compound processing 208 is done and a new output image 226 is displayed on display 204. Output image 226 is the compounded result of frames 212, 214 and 216.

Accordingly, when the new frame 218 is received, it is scan converted, stored in frame memory and compound processing 208 is done to output a new image 226, the result of compounding component images 214, 216 and 218.

Figure 3:
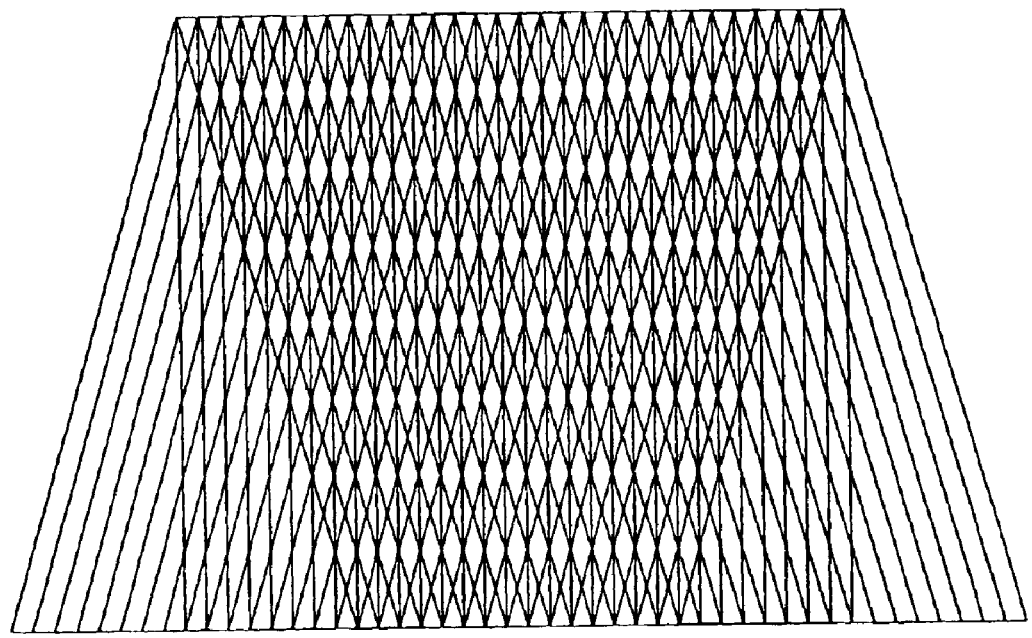
FIG. 3 illustrates the compound ultrasound imaging methods of the prior art.
Figure 3:
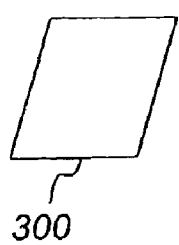
Figure 3:
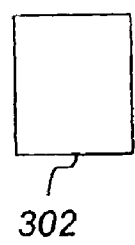
Figure 3:
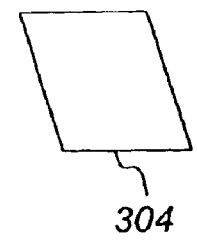

FIG. 3 is a drawing of a typical prior-art image compounding method. For simplicity, N, the number of component images is equal to 3. Of course the following discussion is not limited to N=3 component images.

In prior art compounding methods, N images 300, 302, 304 of the same target structure are acquired from different angles and compounded to yield an ultrasound compound image. Each frame is a set of lines at the same angle. Non-overlapping areas—where just one image is acquired—are typically cropped because they exhibit a different persistence behavior that can be annoying when dynamically scanning. Thus, the output compounded image typically has the geometry of component image 302.

Figure 4:
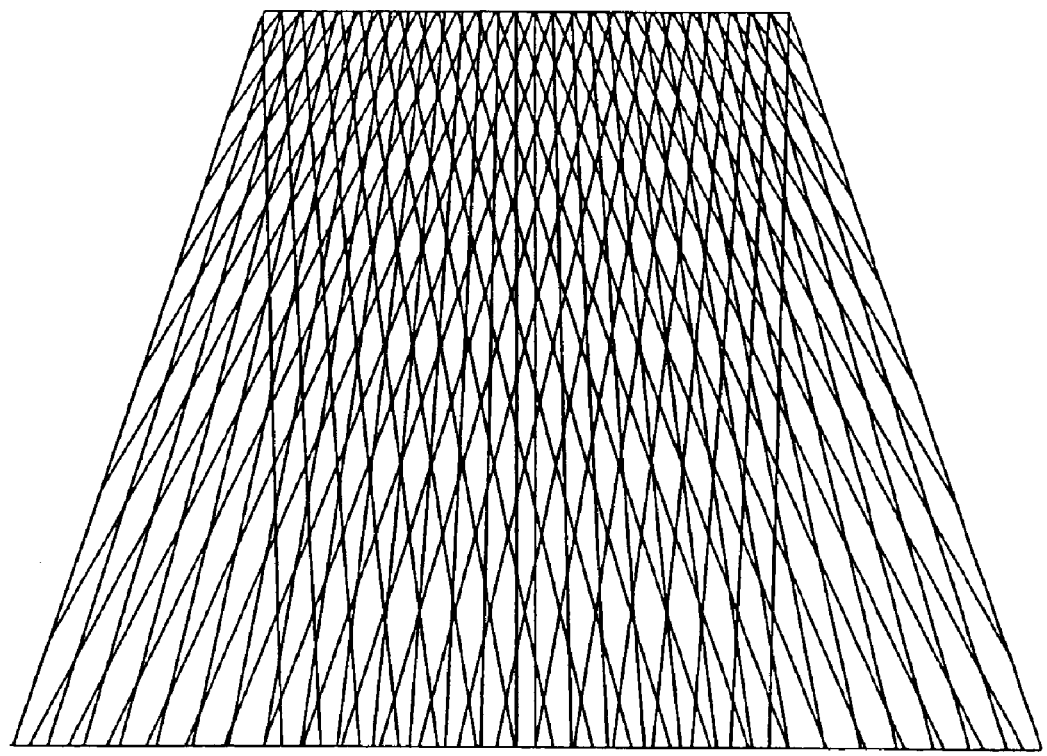
FIG. 4 illustrates a compound ultrasound method according to a first and second embodiment of the present invention.
Figure 4:
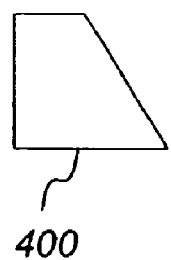
Figure 4:
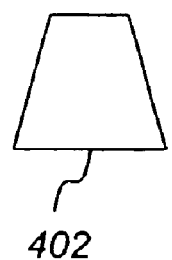
Figure 4:
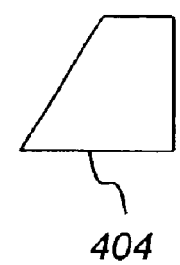

FIG. 4 is a drawing of a compounding method according to a first and second embodiment of the present invention. In a first embodiment, frames 400, 402 and 404, having different geometry properties are acquired. They undergo scan conversion according to their individual geometry properties and are compounded to yield a compounded ultrasound image.

Frames 400, 402 and 404 have different geometries (i.e., each component line of the frame may have different angles). The example in FIG. 4 shows trapezoidal-shaped images. This allows the compound imaging method to be used in trapezoidal imaging, or phased array imaging for example. Also, the angles between ultrasound lines can be chosen to be very different in the center of the images 400, 402 and 404, for better speckle and noise reduction. The angles on the sides of the image can be limited independently to reduce side-lobe artifacts occurring in trapezoidal imaging.

In another embodiment, frame 400, 402 and 404 not only exhibit different geometries, but also have different properties to increase the compounding effect. For example, frames 400, 402 and 404 can be acquired using different excitation frequencies, voltages, filters, envelope sustain, etc . . . Furthermore, different properties can be applied to different scanlines of each component image. For example, different frequencies can be used on the sides of the component images 400, 402, 404 to increase the speckle and noise reduction while keeping the line-angles between images close to one another to avoid side-lobes. By way of example, the line absolute angles for each frame 400, 402 and 404 can vary from:

0° to 30° for frame 400;

−15° to 15° for frame 402;

−30° to 0° for frame 404.

Adapting the frame geometry and component line density/angles effectively increases/decreases the amount of compounding between frames. For example, more independent angles in the center of the image provides more compounding effect; reducing the angle difference on the sides of the image provides better focusing. While adjusting line duration, frames are created with different geometries. The process described permits compounding these frames without loss of information. Since the line durations are optimized, the frame rate is as high as possible.

It should be noted that the basic process of compounding a set of component frames is similar to the prior art described above. However, instead of applying a set of identical line parameters to an entire component frame, the present invention varies individually, line by line, the angle, duration, frequency, etc., parameter of each line to build a frame with a custom geometry.

Figure 5:
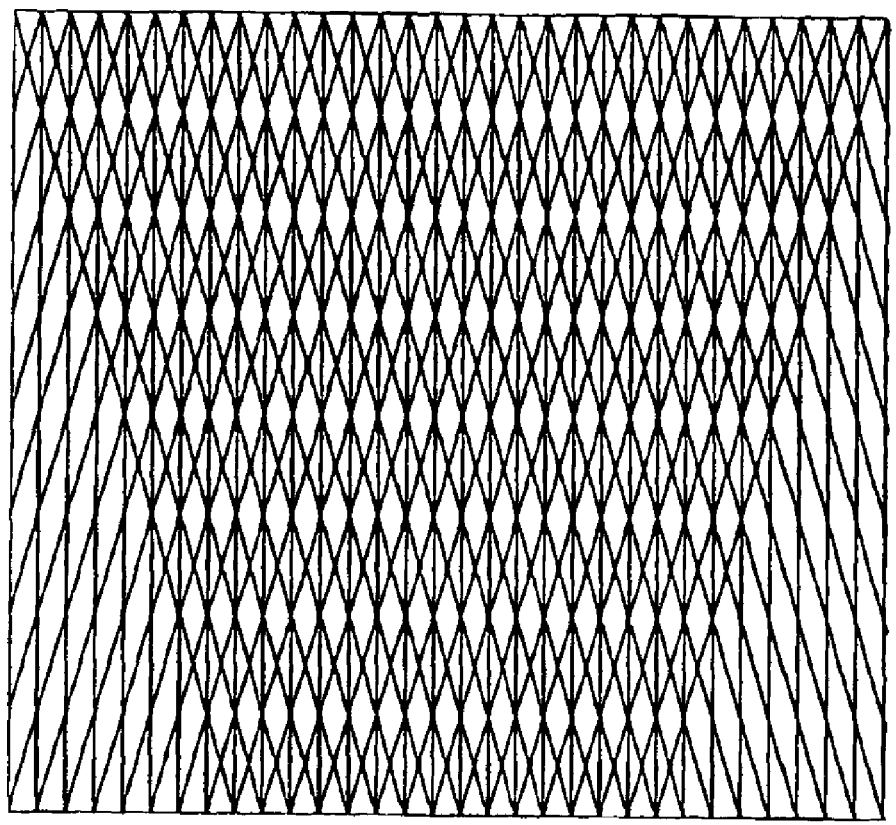
FIG. 5 illustrates a compound ultrasound method according to a third embodiment of the present invention.
Figure 5:
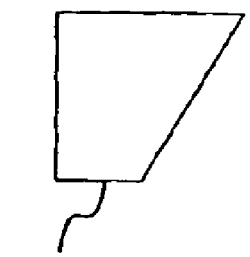
Figure 5:
Figure 5:
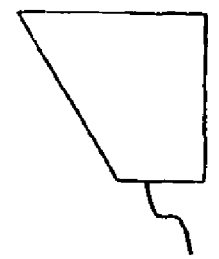

FIG. 5 is a drawing of a proposed compounding method according to a third embodiment of the present invention.

In a third embodiment of the present invention, the component frames 500, 502 and 504 are cropped so that they all overlap and fit in the component frame 502. Not only are the frames cropped at the time of scan conversion, but they are also cropped while acquiring them. This allows for increasing the frame rate and thus reducing the persistence effect inherent to compound imaging.

The frame rate is increased as the scanline durations will be shorter when the lines are cropped and thus there is no need to wait to acquire another scanline. To illustrate the concept, for each component frame in FIG. 5, each line exhibits the same angle properties; −15° for frame 500; 0° for frame 502; 15° for frame 504. However, the line duration of the lines extending outside the rectangle is reduced so that only the useful information is kept to generate the compound image which has a rectangular shape. By way of example, the line parameters can be as follows:

Frame 500
    Line 1: −15°, line duration of 20us
    Line 2: −15°, line duration of 40us
    Line 3: −15°, line duration of 60us
    . . .
    Line 128: −15°, line duration of 150us
Frame 501
    Line 1: 0°, line duration of 150us
    Line 2: 0°, line duration of 150us
    Line 3: 0°, line duration of 150us
    . . .
    Line 128: 0°, line duration of 150us
Frame 502
    Line 1: 15°, line duration of 150us
    Line 2: 15°, line duration of 150us
    Line 3: 15°, line duration of 150us
    . . .
    Line 126: 15°, line duration of 60us
    Line 127: 15°, line duration of 40us
    Line 128: 15°, line duration of 20us This third embodiment shows a compounding method that allows for maximum use of the time necessary to acquire component images. Of course, the first or second embodiment can be used in conjunction with the third embodiment of the present invention.

Each of the foregoing embodiments is accomplished by varying individually, line by line, the angle, duration, frequency, etc., parameter for each line to build a frame with a custom geometry. This contrasts with the prior art where each frame is built from a set of identical line parameters.

Figure 6A:
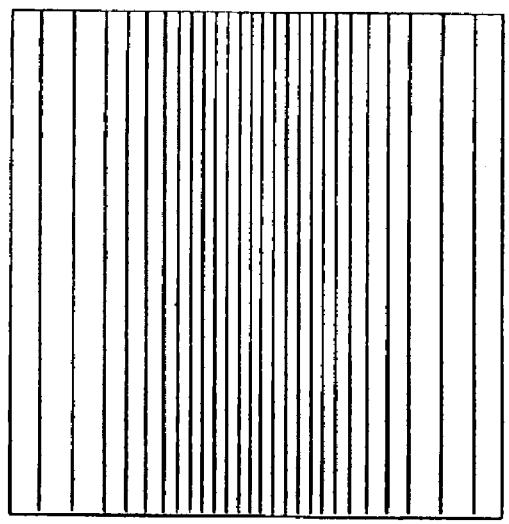
FIGS. 6A, 6B and 6C illustrate compounding frame images with adjusted angle between lines.
Figure 6B:
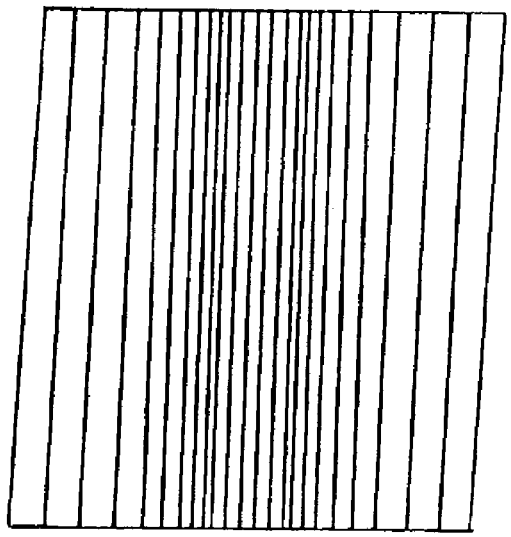
Figure 6C:
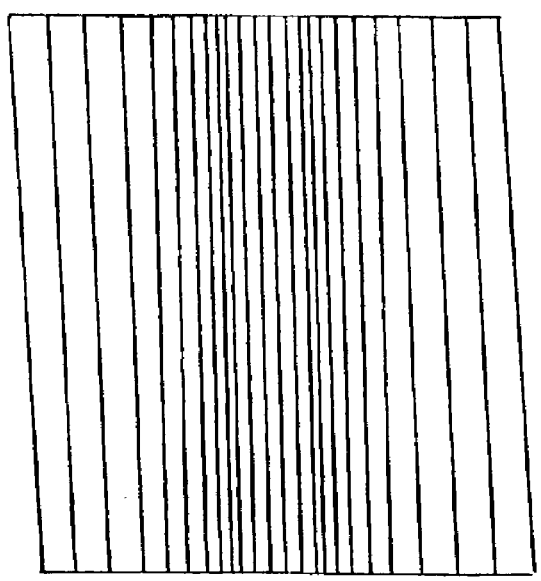
Figure 7:
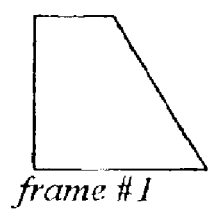
FIG. 7 illustrates three frames to be compounded with the same line angles on the side of the image.
Figure 7:
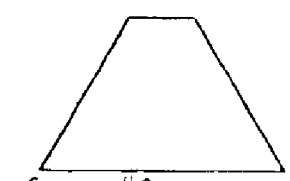
Figure 7:
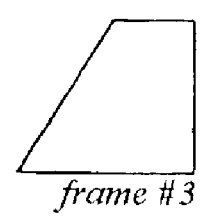

The more angle between component frames, the more the compounding effect. Thus, the amount of compounding is adjusted by adjusting, individually, line by line, the line angles for each component frame. This adjusts line density as well; that is, less angle between lines displays as more line density. FIGS. 6A, 6B and 6C illustrate the concept for achieving more line density in the center of the frame. Alternatively, to achieve more compounding in the center of the image, the line angles on the side can be set to be the same (see frame #1, frame #2 and frame #3 in FIG. 7). The two methods can be combined to get more compounding and line density in the center of the compounded image.

Good focusing properties on the sides of the frames can be obtained by reducing the angles on the sides of the frames. It is a physical fact that there is less good focusing on the sides of the probes, especially with line angulation. This is because the transmit/receive aperture is truncated on the sides of the probe due to the lack of transducers.

There are two approaches to building the frames with different geometries. Either angle the lines or adjust line durations to make the ultrasound line last just the amount of time necessary. By reducing the line duration so that unused parts of the line are not even acquired, the total component frame duration is reduced, thus the frame rate is increased. Accordingly, the "persistence effect" due to compounding is reduced.

Figure 8:
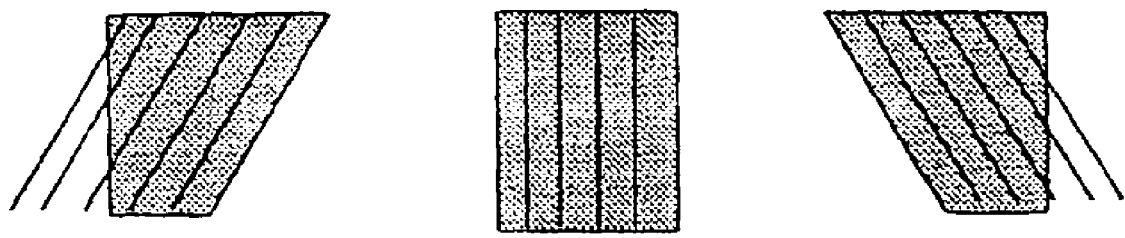
FIG. 8 illustrates a method wherein each line is at the same deviation angle but the parts of the lines outside the shaded areas are not acquired.

FIG. 8 shows an example of three individual frames which use the same deviation angle for each line, but the parts of the line outside the shaded area are not acquired. Accordingly, no time is lost.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of ultrasound compound imaging comprising:
    a. acquiring N component images with variable rayline steering angles;
    b. combining the N component images into a combined image;
    c. cropping the combined image to generate a display image; and
    d. outputting the display image to a display,
    wherein the cropped image is obtained by keeping raylines to the right of the leftmost line steered with an angle of A degrees, and keeping raylines to the left of the rightmost line steered with an angle of B degrees, and
    wherein the leftmost line of each component image has an angle less than or equal to A degrees and the rightmost line of each component image has an angle greater than or equal to B degrees.

2. The method of claim 1, wherein A and B are equal to 0.

3. The method of claim 1, wherein A and B are greater than 0.

4. The method of claim 1, wherein A and B are less than 0.

5. The method of claim 1, wherein A is less than 0 and B is greater than 0.

6. The method of claim 1, wherein A is greater than 0 and B is less than 0.

* * * * *